United States Patent

Kanai et al.

[11] Patent Number: 5,233,374
[45] Date of Patent: Aug. 3, 1993

[54] RED EYE PREVENT CONTROL DEVICE IN AN AUTOMATIC FOCUS ADJUSTMENT CAMERA AND RED EYE PREVENT PHOTOGRAPHING METHOD INVOLVING AUTOMATIC FOCUS ADJUSTMENT

[75] Inventors: Hachiro Kanai, Kawasaki; Toshio Sosa, Narashino; Tohru Fukuhara, Isehara, all of Japan

[73] Assignee: Nikon Corporation, Tokyo, Japan

[21] Appl. No.: 938,688

[22] Filed: Sep. 1, 1992

Related U.S. Application Data

[63] Continuation of Ser. No. 819,582, Jan. 9, 1992, abandoned, which is a continuation of Ser. No. 707,926, May 28, 1991, abandoned, which is a continuation of Ser. No. 644,417, Jan. 22, 1991, abandoned, which is a continuation of Ser. No. 412,445, Sep. 26, 1989, abandoned.

[30] Foreign Application Priority Data

Sep. 29, 1988 [JP] Japan .................. 63-247828

[51] Int. Cl.$^5$ .................. G03B 13/36; G03B 15/03
[52] U.S. Cl. .................. 354/400; 354/415; 354/137
[58] Field of Search .................. 354/400, 402, 137, 415

[56] References Cited

U.S. PATENT DOCUMENTS

| | | | |
|---|---|---|---|
| 4,285,588 | 8/1981 | Mir | 354/137 |
| 4,299,464 | 11/1981 | Cushman | 354/137 |
| 4,305,647 | 12/1981 | Ishida | 354/33 |
| 4,457,611 | 7/1984 | Ishida et al. | 354/415 |
| 4,978,989 | 12/1990 | Nakano et al. | 354/413 |
| 4,999,663 | 3/1991 | Nakamura | 354/415 |

FOREIGN PATENT DOCUMENTS

| | | |
|---|---|---|
| 52-80120 | 6/1977 | Japan . |
| 58-48088 | 10/1977 | Japan . |
| 58-9130 | 1/1983 | Japan . |
| 1-154133 | 6/1989 | Japan . |

OTHER PUBLICATIONS

Piper, Floyd G., *psa Journal*, Jul., 1952, vol. 18, No. 7A, pp. 425–426 & 444.

Primary Examiner—Russell E. Adams
Attorney, Agent, or Firm—Shapiro and Shapiro

[57] ABSTRACT

The present invention is designed such that during flash photographing which involves pre-light emission for preventing red eye, focus adjustment is effected on the basis of focus adjustment information detected during the time from after the pre-light emission is effected until shutter release is effected and therefore, the time lag from the detection of the focus adjustment information until the shutter release can be minimized and a photo-taking lens can be reliably focused to a desired object even during flash photographing which involves the pre-light emission.

13 Claims, 9 Drawing Sheets

RED EYE PREVENT CONTROL DEVICE IN AN AUTOMATIC FOCUS ADJUSTMENT CAMERA AND RED EYE PREVENT PHOTOGRAPHING METHOD INVOLVING AUTOMATIC FOCUS ADJUSTMENT

This is a continuation of application Ser. No. 819,582 filed Jan. 9, 1992; which is a continuation of application Ser. No. 707,926 filed May 28, 1991; which is a continuation of application Ser. No. 644,417 filed Jan. 22, 1991; which is a continuation of application Ser. No. 412,445 filed Sep. 26, 1989, all of which are now abandoned.

REFERENCE TO RELATED APPLICATION

Reference is made to commonly assigned continuation application Ser. No. 930,466, entitled "Control Device for Preventing Red-Eye Effect on Camera," filed Aug. 20, 1992 by Toru Fukuhara et al.

BACKGROUND OF THE INVENTION

1. Field of the Invention

This invention relates to a red eye prevent control device in an automatic focus adjustment camera for preventing the red eye effect during flash photographing and a red eye prevent photographing method involving automatic focus adjustment.

2. Related Background Art

The red eye effect refers to the fact that in color photographing using an electronic flash unit, man's eyes are photographed in red or hold color. This effect occurs by the flash of the light emitting portion of an electronic flash unit passed through the pupil of an eye being reflected by the retina portion and the reflected light falling upon a film. There are a number of capillary vessels in the retina portion of the eye and the hemoglobin in the blood therein is red and therefore, the reflected light therefrom falls upon a film with a tinge of red.

It has been empirically found that it is under the following conditions that the red eye effect occurs conspicuously in a photograph.

1) When the environment of photographing is dark

The size of the pupil of man's eye is varied by the brightness of the environment, and when the environment is dark, the diameter thereof widens to about 7–8 mm. At such time, the quantity of light incident on the eye and the quantity of reflected light from the eye become great and therefore, as a matter of course, the red eye effect is liable to be conspicuous.

2) When the distance between the light emitting portion of an electronic flash unit and the optic axis of a photo-taking lens is short The retina portion of the eye is considerably high in reflectance and at the same time, high in the directionality of reflection. Accordingly, when the distance between the light emitting portion of the electronic flash unit and the optic axis of the photo-taking lens is short and the three elements (the light emitting portion, the photo-taking lens and the eye) are in a positional relation in which the regularly reflected light from the retina is ready to intactly enter the photo-taking lens, red eye occurs strongly. That is, when the angle at which the eye of a person which is the object to be photographed looks at the photo-taking lens and the light emitting portion of the flash light source is a small angle less than a certain degree, red eye occurs without fail. Empirically, this angle is about 2–2.5 degrees. Accordingly, if the light emitting portion of the electronic flash unit is kept apart from the optic axis of the photo-taking lens, occurrence of red eye will be prevented, but this is limited by the distance from the camera to the object (hereinafter referred to as the object distance) and it is difficult to avoid red eye when the object distance is a predetermined value or greater.

So, a technique for preventing the red eye effect is known. For example, in psa *JOURNAL*, July, 1952, there is disclosed a method of accustoming an eye to a bright environment before photographing and emitting a flash with the pupil of the eye reduced to 3 mm or less, thereby preventing red eye.

In Japanese Patent Publication No. 58-48088, there is disclosed a technique in which irradiation by a preliminary illuminating lamp is effected before photographing for the time necessary for the pupil to close and the light emitting portion of an electronic flash unit is caused to emit light when the pupil has assumed approximately its smallest diameter, thereby effecting photographing.

Also, in Japanese Laid-Open Patent Application No. 58-9130, there is disclosed a method in which two flash discharge tubes are provided and one of them is caused to emit light preliminarily to close the pupil, whereafter the other discharge tube is caused to emit light, thereby effecting actual photographing.

The assignee of the present application has also filed red eye prevent control devices which have improved these prior arts as U.S. application Ser. No. 323,386 (filed on Mar. 14, 1989) and U.S. application Ser. No. 389,795 (filed on Aug. 4, 1989). The former application includes as an embodiment a camera as will be described hereinafter. The camera starts the detection of focus adjustment information for focusing a photo-taking lens to an object with the half depression operation of a shutter release button, and effects automatic focus adjustment on the basis of the detected focus adjustment information. Thereafter, with the full depression operation of the release button, pre-light emission for preventing red eye is effected by a flash discharge tube, and after the lapse of the time necessary for the pupil of a person who is the object to be photographed to be closed enough to prevent the red eye effect by the stimulus of the pre-light emission (the order of 0.75 second, and this time will hereinafter be referred to as the pupil reduction waiting time), the shutter is operated and main light emission for flash photographing is effected by another flash discharge tube or the same flash discharge tube.

Accordingly, in U.S. application Ser. No. 323,386, there has been the undesirable possibility that a time lag occurs during the time from the detection of the focus adjustment information until photographing is effected and an out-of-focus photograph is taken when the object moves during that time.

SUMMARY OF THE INVENTION

It is the object of the present invention to provide a red eye prevent control device which enables a photograph which is in focus to an object to be photographed to be reliably obtained even during flash photographing which involves pre-light emission for preventing red eye.

To achieve the above object, the present invention is designed such that during flash photographing which involves pre-light emission for preventing red eye, focus adjustment is effected on the basis of focus adjustment information detected during the time from after the pre-light emission is effected until shutter release is effected and therefore, the time lag from the detection of the focus adjustment information until the shutter release can be minimized and a photo-taking lens can be reliably focused to a desired object even during flash photographing which involves the pre-light emission.

DESCRIPTION OF THE PREFERRED EMBODIMENTS

A first embodiment of the present invention will hereinafter be described with reference to FIGS. 1 to 7.

Figure 1:
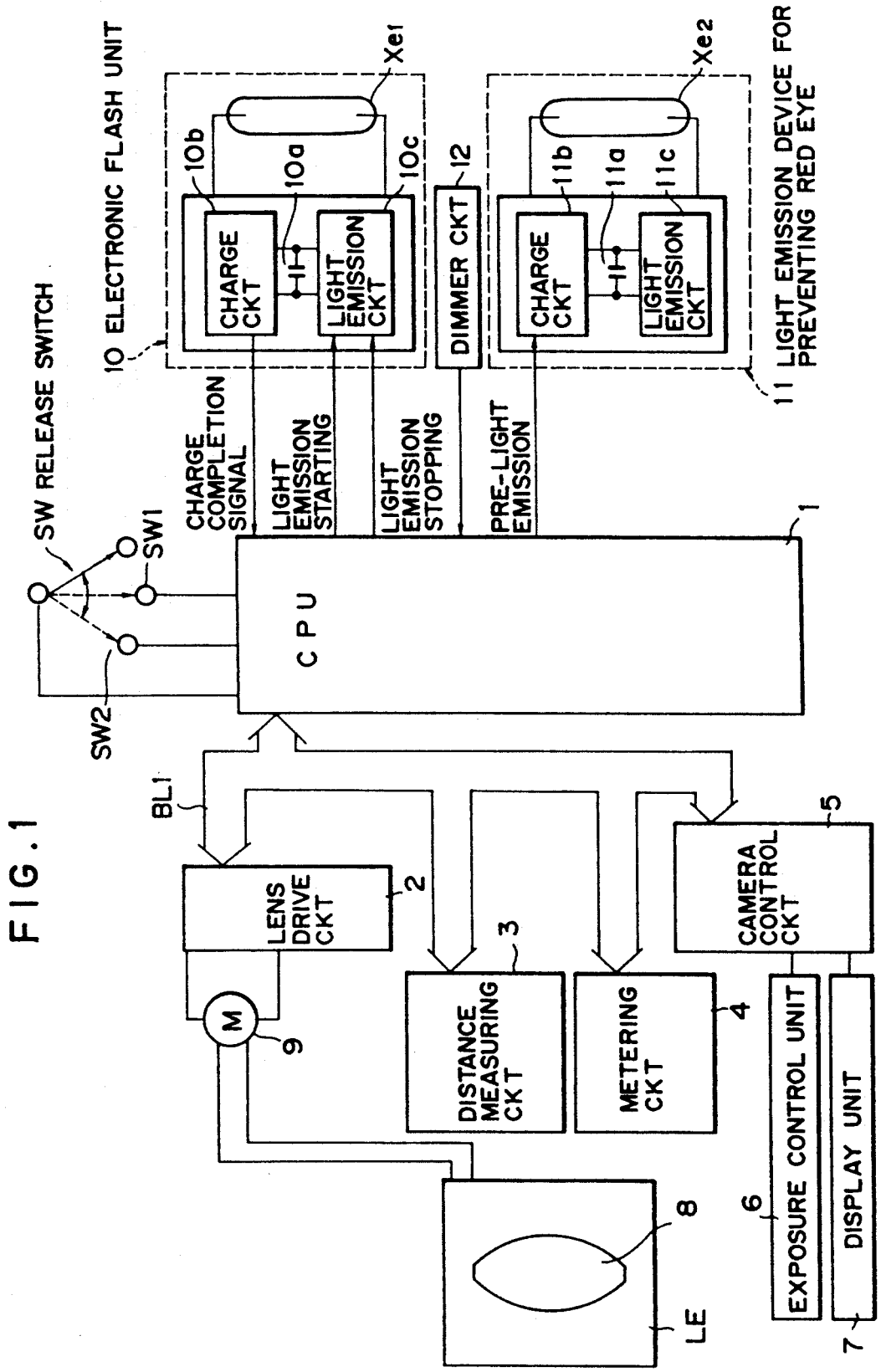
FIG. 1 is a block diagram of a red eye prevent control device showing a first embodiment of the present invention.

In FIG. 1 which shows the entire construction, a lens drive circuit 2, a distance measuring circuit 3, a metering circuit 4 and a camera control circuit 5 are connected to a CPU 1 through a signal transmission line BL1.

The distance measuring circuit 3 is a conventional circuit for measuring the distance of an object which occupies the central portion of a photographing picture plane. As this distance measuring circuit 3, adoption may be made of a conventional active triangular distance measuring circuit including a light emitting element for applying a light beam toward an object, and a light receiving element disposed at a predetermined distance from the light emitting element and receiving the reflected light of said light beam from the object, or a conventional ultrasonic distance measuring circuit including an ultrasonic transmitter and an ultrasonic receiver. The distance measuring circuit 3 outputs the result of distance measurement as object distance information D (FIG. 7) to the CPU 1.

The metering circuit 4 has a light receiving element for receiving a photo-taking light beam passed through a photo-taking lens LE, and puts out the output of this light receiving element as object luminance information B to the CPU 1.

An exposure control unit 6 such as an aperture and a shutter and a display unit 7 such as a light crystal display device are connected to the camera control circuit 5. This camera control circuit 5 causes the display unit 7 to display the information regarding photographing such as the exposure value and the shutter time by a command from the CPU 1, and also drives the exposure control unit 6 to thereby accomplish photographing.

A motor 9 for driving a focusing lens 8 within the photo-taking lens LE in the direction of the optic axis is connected to the lens drive circuit 2. The lens drive circuit 2 drivingly controls the motor 9 by a lens drive signal produced by the CPU 1 on the measured distance information from the distance measuring circuit 3 and drives the lens 8, thereby accomplishing the operation of focusing the photo-taking lens to the object occupying the central portion of the photographing picture plane, i.e., the automatic focus adjustment.

An extreneously mounted electronic flash unit 10 and a light emission device 11 for preventing red eye formed integrally with the electronic flash unit 10 are also connected to the CPU 1.

The electronic flash unit 10 has a xenon tube (a flash discharge tube) Xe1 as a light emission source, a main capacitor 10a storing therein charging charges for causing the xenon tube Xe1 to emit light, a charge circuit 10b for charging the main capacitor 10a, and a light emission circuit 10c for controlling the start and termination of the light emission of the xenon tube Xe1. The charge circuit 10b puts out a charge completion signal to the CPU 1 when the charging of the main capacitor 10a is completed and the light emission of the xenon tube Xe1 becomes possible. When this charge completion signal is input, the CPU 1 puts out a light emission starting signal to the light emission circuit 10c with the closing of a full depression switch SW2 which will be described later. In response thereto, the light emission circuit 10b supplies the charging charges of the main capacitor 10a to the xenon tube Xe1 and starts the light emission (the main light emission) of the xenon tube Xe1. Also, when a light emission stopping signal is input from the CPU 1 to the light emission circuit 10c during the main light emission, the charging charges supplied to the xenon tube Xe1 are cut off to thereby stop the main light emission of the xenon tube Xe1. The quantity of emitted light of the xenon tube Xe1 is metered by a dimmer circuit 12, and is input as metered data for dimming to the CPU 1.

The light emission device 11 for preventing red eye has a xenon tube Xe2 for pre-emitting light to reduce the pupil of man's eye, a capacitor 11a, a charge circuit 11b therefor, and a light emission circuit 11c for controlling the start of light emission, and when a pre-light emission signal is input from the CPU 1 to the light emission circuit 10c, the xenon tube Xe2 emits light to effect pre-light emission.

Further, a release switch SW operatively associated with the operation of a release button (not shown) is connected to the CPU 1. This release switch SW is comprised of a half depression switch SW1 and a full depression switch SW2, and when the release button is depressed by a stroke of half depression or more, the half depression switch SW1 is closed, and when the release button is fully depressed, the full depression switch SW2 is closed. When the half depression switch SW1 is closed, the CPU 1 starts the distance measuring circuit 3 to perform the distance measuring operation, i.e., measure the distance of the object which occupies the central portion of the photographing picture plane, thereby obtaining the object distance information D. Also, when the half depression switch SW1 is closed, the CPU 1 starts the metering circuit 4 to obtain the object luminance information B. Thereafter, when the full depression switch SW2 is closed, the CPU 1 starts the lens drive circuit 2 and the motor 9 on the basis of the object distance information D to effect automatic focus adjustment, and drives the exposure control unit 6 through the camera control circuit 5 to effect photographing. At this time, main light emission is effected by the electronic flash unit 10 as required.

Also, during flash photographing, the CPU 1 judges on the basis of the object distance information D and the object luminance information B whether the current condition is a photographing condition under which the red eye effect occurs as will be described later. If it is judged to be a photographing condition under which the red eye effect occurs, the CPU 1 puts out a red eye judgment signal and sets a red eye prevent mode. When this red eye prevent mode is set, the CPU 1 operates the light emission device 11 for preventing red eye in response to the closing of the full depression switch SW2, whereafter the CPU 1 starts the distance measuring circuit 3 again, and on the basis of the object distance information D obtained thereby, it starts the lens drive circuit 2 and the motor 9 to effect the automatic focus adjusting operation. When a predetermined time (e.g. 0.75 second) elapsed from the operation of the light emission device 11 for preventing red eye, the CPU 1 drives the exposure control unit 6 through the camera control circuit 5 and also puts out a light emission starting signal to the light emission circuit 10c.

The operation of the first embodiment controlled by the CPU 1 will now be described with reference to the flow charts of FIGS. 2 to 6.

Figure 2:
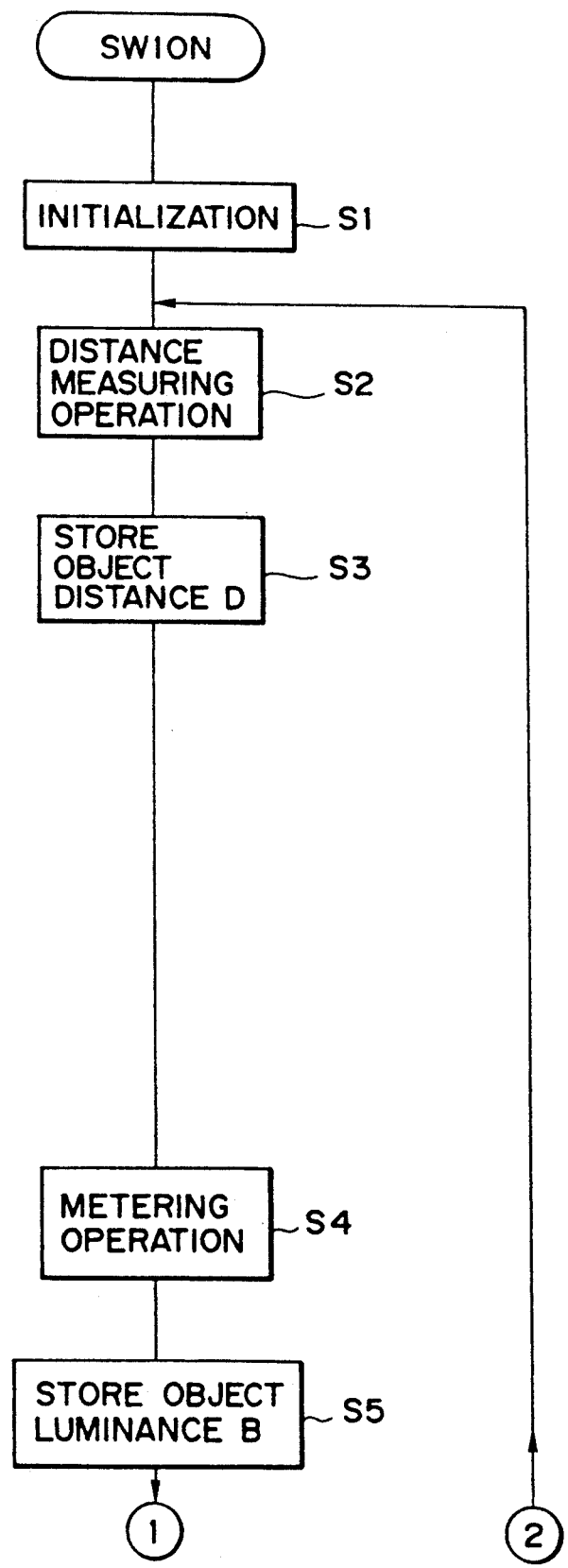
FIGS. 2 to 6 are flow charts showing the operation of the first embodiment.
Figure 3:
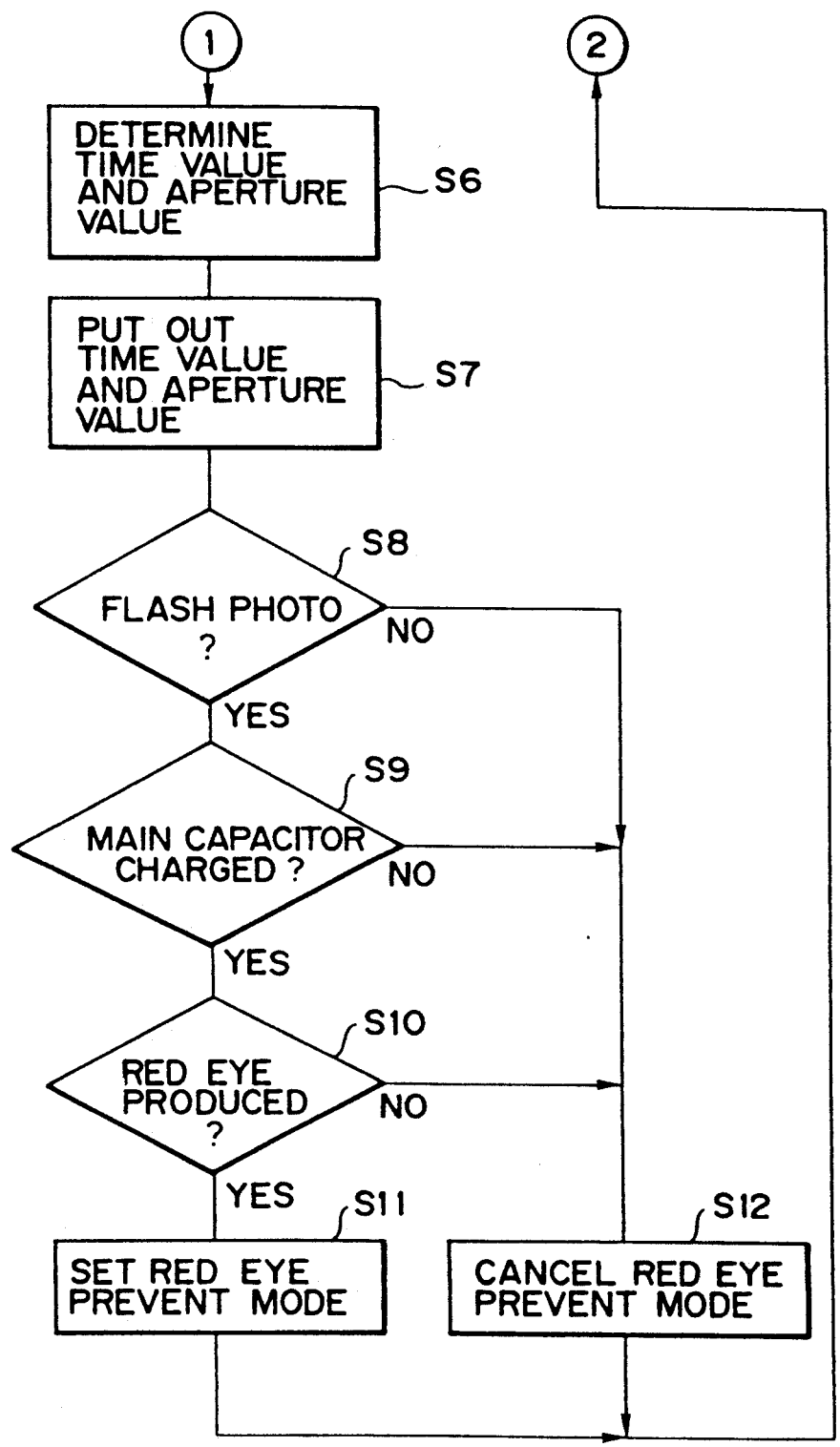

When the half depression switch SW1 is closed, the program shown in FIGS. 2 and 3 is started, and at the step S1 of FIG. 2, the initialization of each circuit such as resetting the content of the memory to the initial value is first effected.

At step S2, the distance measuring circuit 3 is started to effect the distance measuring operation. At step S3, the object distance information D obtained at the step S2 is stored in the memory within the CPU 1.

At step S4, the metering circuit 4 is started to effect the metering operation. At step S5, the object luminance information B obtained at the step S4 is stored in the memory within the CPU 1.

Then at the step S6 of FIG. 3, a time value and an aperture value for which proper exposure is obtained are calculated from the object luminance information B and the film speed information. The time value and the aperture value are put out to the camera control circuit 5 at step S7. The camera control circuit 5 causes these values to be displayed by the display unit 7.

Advance is then made to step S8, where whether the photographing to be effected is photographing using the electronic flash unit 10 is judged. This judgment is done by whether the electronic flash unit 10 is ready to be used (if the shutter is only operated, the electronic flash unit is capable of emitting light in response thereto). In the case of a camera in which the electronic flash unit 10 automatically becomes ready to be used when the object luminance information B exhibits a value lower than a predetermined luminance for which proper exposure will not be obtained unless the electronic flash unit 10 is used, said judgment can be done by whether the object luminance B is lower than said predetermined luminance.

If at step S8, the use of the electronic flash unit 10 is affirmatively judged, advance is made to step S9. If at step S8, the use of the electronic flash unit 10 is negatively judged, advance is made to step S12 which will be described later.

At the step S9, whether the charging of the main capacitor 10a of the electronic flash unit 10 has been completed is judged by whether a charge completion signal is put out from the charge circuit 10b. If the charging by the charge circuit 10b is completed, at the step S9, affirmative judgment is rendered and advance is made to step S10. If the charging is not completed, at the step S9, negative judgment is rendered and advance is made to step S12 which will be described later.

At the step S10, whether the current photographing condition is a photographing condition under which the red eye effect occurs is judged. That is, the possibility of the occurrence of the red eye effect is judged from the difference H (FIG. 7) between the photo-taking lens LE and the light emitting portion of the electronic flash unit 10 and the object distance D stored in the memory within the CPU 1.

Figure 7:
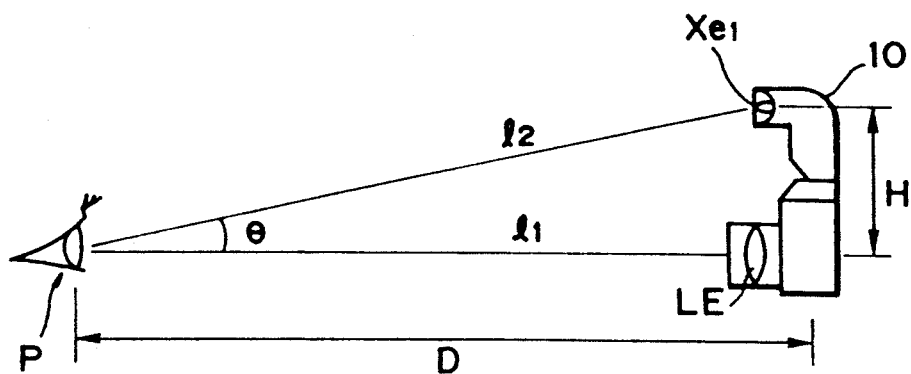
FIG. 7 illustrates a photographing condition under which the red eye effect occurs.

It has been found from an experiment that where as shown in FIG. 7, the pupil P is imprinted on the photograph, if the angle $\theta$ at which the pupil P looks at the photo-taking lens LE and the xenon tube Xe1, i.e., the angle $\theta$ formed between a straight line $l_1$ passing through the centers of the pupil P and the photo-taking lens LE and a straight line $l_2$ passing through the centers of the pupil P and the xenon tube Xe1 of the electronic flash unit 10, is about 2° or less, the frequency of the occurrence of the red eye effect is high. Assuming that the distance between the optic axes of the photo-taking lens LE and the xenon tube Xe1 is H, the angle $\theta$ is represented by $$\tan \theta = H/D,$$

and from this equation, the object distance D can be represented by $$D = H/\tan \theta \qquad (1)$$

Accordingly, where for example, the distance H between the optic axes of the photo-taking lens LE and the xenon tube Xe1 of the electronic flash unit 10 is 0.1 m and it is prescribed that the red eye effect occurs for $\theta = 2°$ or less, it can be considered that the red eye effect occurs when the object distance D is approximately $$D = 0.1 \times 28.6 \ m = 2.86 m$$

since 1/tan 2° is 28.6. Accordingly, the predetermined object distance found from the equation (1) can be used as a reference distance for judging the photographing condition for the occurrence of the red eye effect.

On the other hand, when the object luminance is higher than a predetermined standard, the diameter of the pupil is small and therefore the red eye effect hardly occurs.

From the foregoing, in the present embodiment, the red eye effect is judged to occur when the stored object distance D is a reference distance or greater and the object luminance B is less than a reference luminance, and if at step S10, these conditions are satisfied, advance is made to step S11, and if these conditions are not satisfied, advance is made to step S12.

At the step S11, the red eye prevent mode is set, whereafter return is made to the step S2, and the process of the step S2 and the subsequent steps is repeated.

At the step S12, the setting of the red eye prevent mode is cancelled, whereafter return is made to the step S2, and the process of the step S2 and the subsequent steps is repeated.

The above-mentioned distance H is calculated in the CPU 1, for example, by the distance information H which conforms to the level of the xenon tube Xe1 being input from the electronic flash unit 10 side to the camera side. When the level of the xenon tube Xe1 is variable, the distance information H also fluctuates in conformity with the fluctuation of the level of the xenon tube Xe1.

Figure 4:
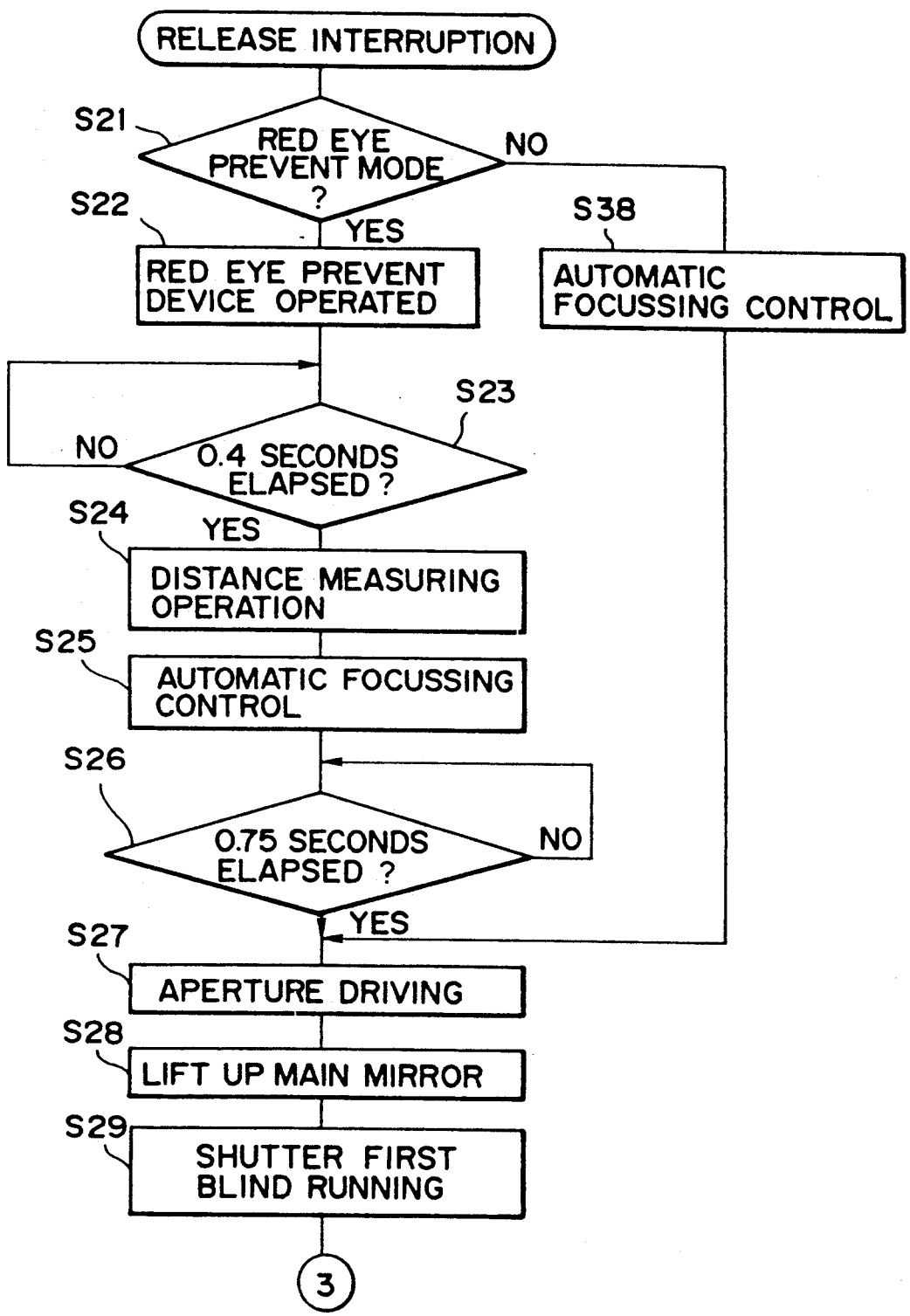
Figure 5:
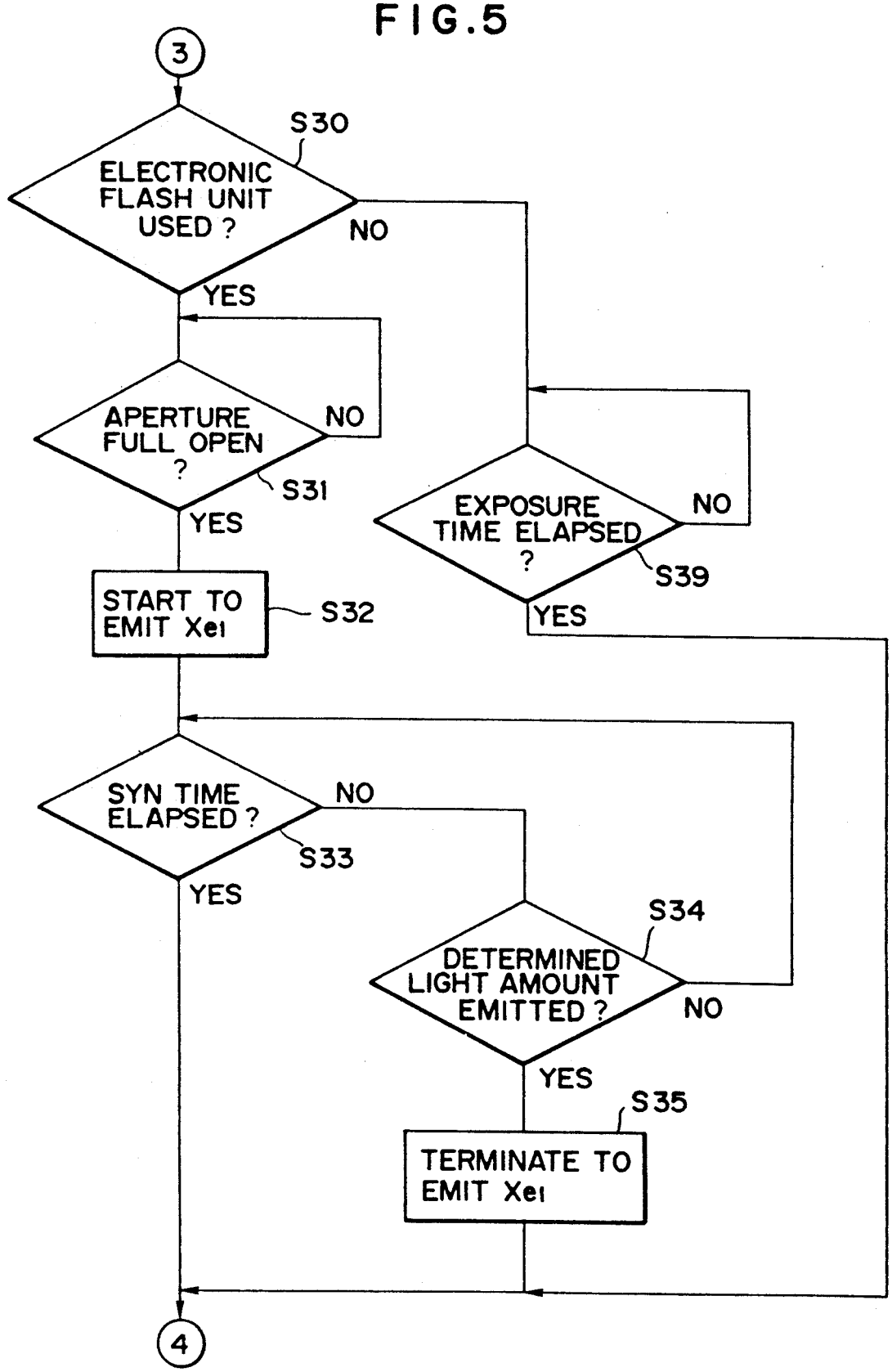
Figure 6:
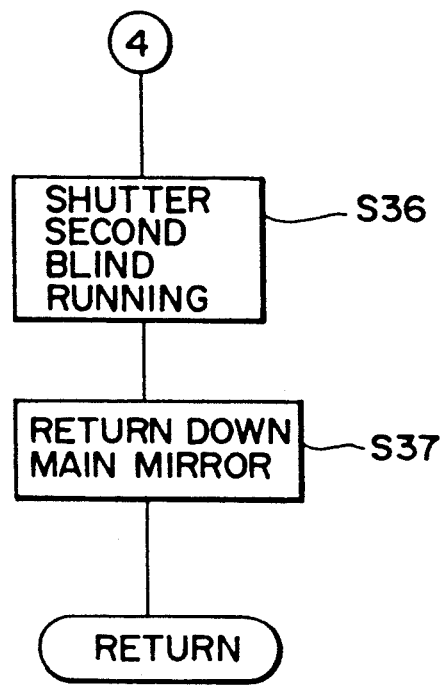

When in this state, the full depression switch SW2 (FIG. 1) is closed, the interruption routine shown in FIGS. 4–6 is started, and at the step S21 of FIG. 4, whether the red eye prevent mode is set is first judged. If the step S21 is affirmatively judged, advance is made to step S22, where a pre-light emission signal is put out to the light emission device 11 for preventing red eye and the xenon tube Xe2 is caused to emit flash, thus irradiating the object. That is, pre-light emission is effected. When the pupil reduction waiting time of 0.75 second elapses from after the stimulus of this pre-light emission is received, the diameter of the pupil of the person which is the object reduces to such a degree that the red eye effect does not occur.

Then at step S23, the photographer waits until 0.4 second elapses from the pre-light emission by the light emission device 11 for preventing red eye. When 0.4 second elapses, at step S24, the distance measuring operation is again performed and the object distance information D is newly found. At step S25, the CPU 1 starts the lens drive circuit 2 and the motor 9 on the basis of the object distance information D obtained at the step S24, thereby effecting automatic focusing control.

At the next step S26, whether 0.75 second (the pupil reduction waiting time) has elapsed from the pre-light emission by the light emission device 11 for preventing red eye is judged, and this judgment is repeated until 0.75 second elapses. There is a lapse of time of 0.35 second from the point of time at which shift is made to the step S24 until the point of time at which an affirmative result is obtained at step S26. This 0.35 second agrees with the time required for the distance measuring operation of the step S24 and the automatic focusing control operation of the step S25.

At the next step S27, the aperture is driven to the aperture value calculated at the step S6, through the camera control circuit 5, and then at step S28, the main mirror which has directed the photographing light beam from the photo-taking lens LE to a viewfinder is lifted up so that the photographing light beam is directed to the film. At step S29, the shutter first blind is caused to run.

Thereafter, at the step S30 of FIG. 5, whether the use of the electronic flash unit 10 is selected is judged again. If the step S30 is affirmed, advance is made to step S31, where whether the aperture is full open is judged. If the step S31 is negated, the judgment of the step S31 is repeated until the step S31 is affirmed, and it is waited for the aperture to become full open, and if the step S31 is affirmed, at step S32, a light emission starting signal is put out to the light emission circuit 10c of the electronic flash unit 10 to thereby start the main light emission by the xenon tube Xe1. Thereafter advance is made to step S33, where whether the elapsed time from the start of the running of the shutter first blind has reached the synchro time (e.g. 1/250 second) is judged. If the step S33 is negated, advance is made to step S34, where whether the amount of light emitted from the xenon tube Xe1 has reached a predetermined value is judged. This is effected on the basis of the metering data for dimming of the above-described dimmer circuit 12. If the step S34 is negated, return is made to the step S33. If the step S34 is affirmed, at step S35, a light emission stopping signal is put out to the light emission circuit 10c to stop the light emission of the xenon tube Xe1, whereafter advance is made to the step S36 of FIG. 6.

When at the step S33, the affirmative result that the elapsed time from the start of the running of the shutter first blind has reached the synchro time is obtained, advance is also made to the step S36 of FIG. 6.

At the step S36 of FIG. 6, the shutter second blind is caused to run to thereby close the shutter and subsequently, at step S37, the main mirror is returned down, and then return is made.

By the above-described operation, the flash photographing in a state in which the diameter of the pupil of the person who is the object has reduced enough is ensured and therefore, the occurrence of the red eye effect is prevented.

If at the step S21 of FIG. 4, it is judged that the mode is not the red eye prevent mode, at step S38, the automatic focusing control operation is executed, and shift is made to the step S27.

If at the step S30 of FIG. 5, it is judged that the use of the electronic flash unit is not selected, advance is made to step S39, where whether the elapsed time from the running of the shutter first blind has reached the time value calculated at the step S6 is judged. If the step S39 is negated, the judgment is repeated until the step S39 is affirmed, and it is waited for the shutter time to elapse, and if the step S39 is affirmed, advance is made to the step S36 of FIG. 6.

As described above, the automatic focusing control operation in the first embodiment is designed to be performed on the basis of the object distance information D obtained by the distance measuring operation performed immediately before that (in the case of the non-red eye prevent mode, the distance measuring operation performed after the half depression, and in the case of the red eye prevent mode, the distance measuring operation performed after the pre-light emission), whereas the present invention is not restricted thereto. The present invention can also be applied, for example, to a camera provided with an automatic focus adjusting device of the type in which focus detection is effected on the basis of the positional deviation between object images formed on a pair of light receiving elements each comprising a CCD and at the same time, a photo-taking lens is brought toward the in-focus position on the basis of the detection output thereof and which can detect the object distance as well. Description will hereinafter be made of a second embodiment in which the present invention is applied to such a camera. The constructions functionally similar to those in the first embodiment and the steps of flow charts showing similar operations are given similar reference characters and need not be described.

Figure 8:
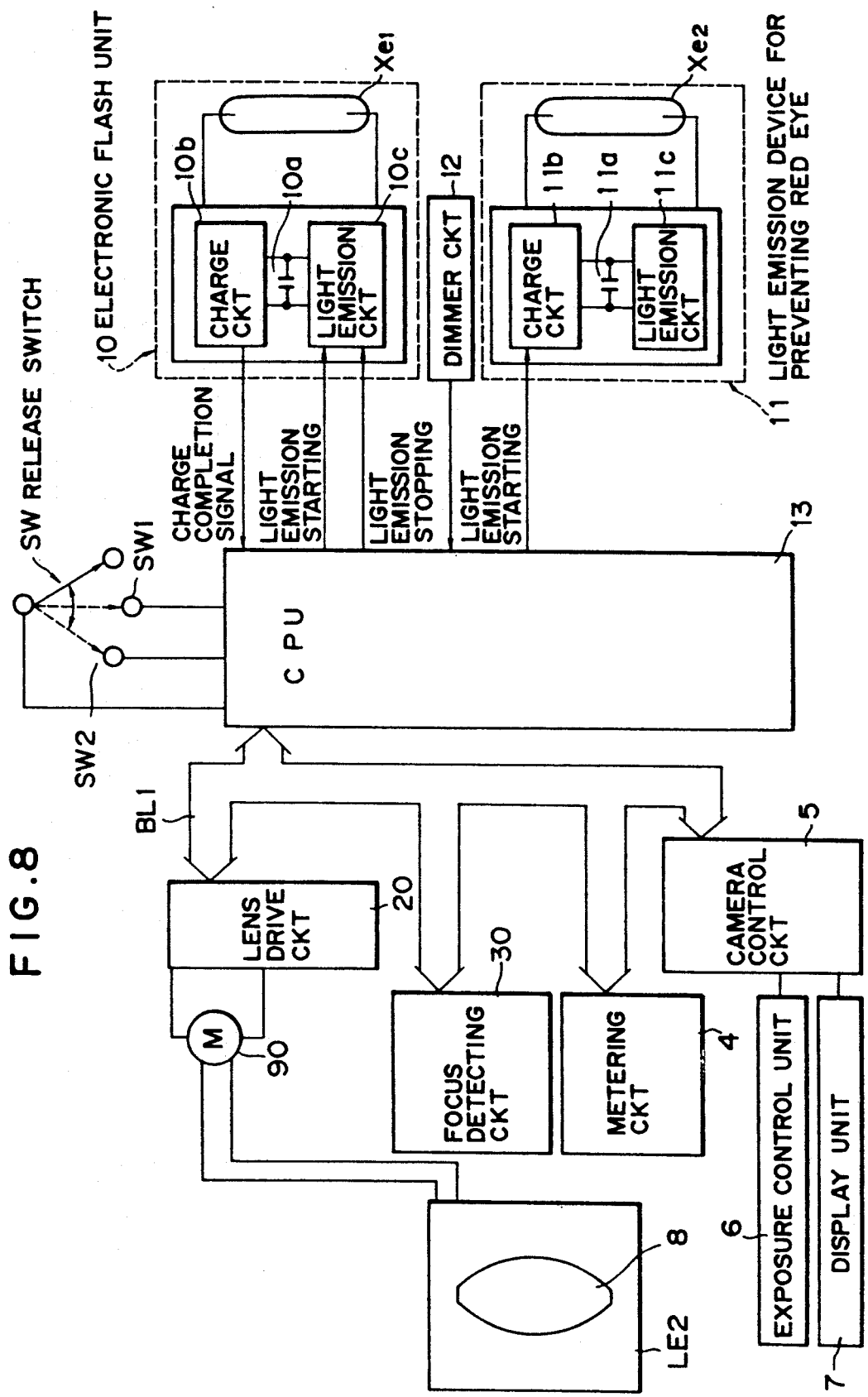
FIG. 8 is a block diagram of a red eye prevent control device showing a second embodiment of the present invention.

In FIG. 8 which shows the entire construction, the differences from FIG. 1 showing the first embodiment reside in a CPU 13, a lens drive circuit 20, a focus detecting circuit 30 and a photo-taking lens LE2.

The focus detecting circuit 30 has a pair of light receiving elements (not shown) each comprising a CCD or the like. The images of an object which occupies the central portion of the photographing picture plane are formed on the pair of light receiving elements. This image formation is accomplished by a pair of optical systems (not shown) which receive only the light from the object occupying said central portion, of the photographing light beam passed through the photo-taking lens LE2. Thereby the object images on the pair of light receiving elements are displaced in opposite directions in conformity with the focus-adjusted state of the photo-taking lens LE2. On the basis of the electrical signals from the two light receiving elements, a focus detection signal indicative of the amount and direction of deviation between the imaging plane of the object and the predetermined imaging plane is put out to the CPU 13.

A motor 90 for driving the focusing lens 8 of the photo-taking lens LE2 from a position in which it is focused to an object at infinity is connected to the lens drive circuit 20, and the motor 90 is drivingly controlled by the lens driving signal from the CPU 13 to drive the focusing lens 8 in the direction of the optic axis thereof, whereby focus adjustment is effected to focus the photo-taking lens to the object which occupies the central portion of the photographing picture plane. Here, the lens driving signal is a signal formed by the CPU 13 on the basis of the above-mentioned focus detection signal.

Even when the lens drive circuit 20 is driving the focusing lens 8, the focus detecting circuit 30 continues focus detection and puts out the focus detection signal, and the CPU 13 continues to put out the lens driving signal on the basis of this focus detection signal. Accordingly, the driving of the focusing lens 8 by the lens drive circuit 20 is continued until in-focus is obtained. In the second embodiment, the driving of the focusing lens 8 by the cooperation between the focus detecting circuit 30 and the lens drive circuit 20 and the motor 90 is called "automatic focus adjustment".

An encoder (not shown) for putting out object distance information D indicative of the position of the focusing lens 8 in the direction of the optic axis, i.e., the position in which the focusing lens 8 is in focus to an object at what distance, is disposed in the photo-taking lens LE2. An example of such encoder is disclosed in the assignee's U.S. application Ser. No. 277,867 (filed in U.S. on Nov. 30, 1988, and its corresponding Japanese Patent Application No. 63-313190, filed in Japan on Dec. 11, 1987).

When the half depression switch SW1 is closed, the CPU 13 starts the focus detecting circuit 30, the lens drive circuit 20 and the motor 90 to thereby effect the automatic focus adjusting operation. That is, it drives the focusing lens 8 to focus the photo-taking lens LE2 to the object which occupies the central portion of the photographing picture plane. At that time, the object distance information D is obtained from the encoder of the photo-taking lens LE2.

Also, during the setting of the red eye prevent mode, the CPU 13 operates the light emission device 11 for preventing red eye in response to the closing of the full depression switch SW2, whereafter it starts the focus detecting circuit 30, the lens drive circuit 20 and the motor 90 again to effect the automatic focus adjusting operation. When a predetermined time (e.g. 0.75 second) elapses from the operation of the light emission device 11 for preventing red eye, the CPU 10 drives the exposure control unit 6 through the camera control circuit 5 and also puts out a light emission starting signal to the light emission circuit 10c.

Description will now be made of the operation of the second embodiment which is controlled by the CPU 10. Among the flow charts of FIGS. 2 to 6 which show the operation of the first embodiment, differences from the second embodiment exist in FIGS. 2 and 4 and therefore, these two figures are altered to FIGS. 9 and 10 so as to fit the second embodiment.

Figure 9:
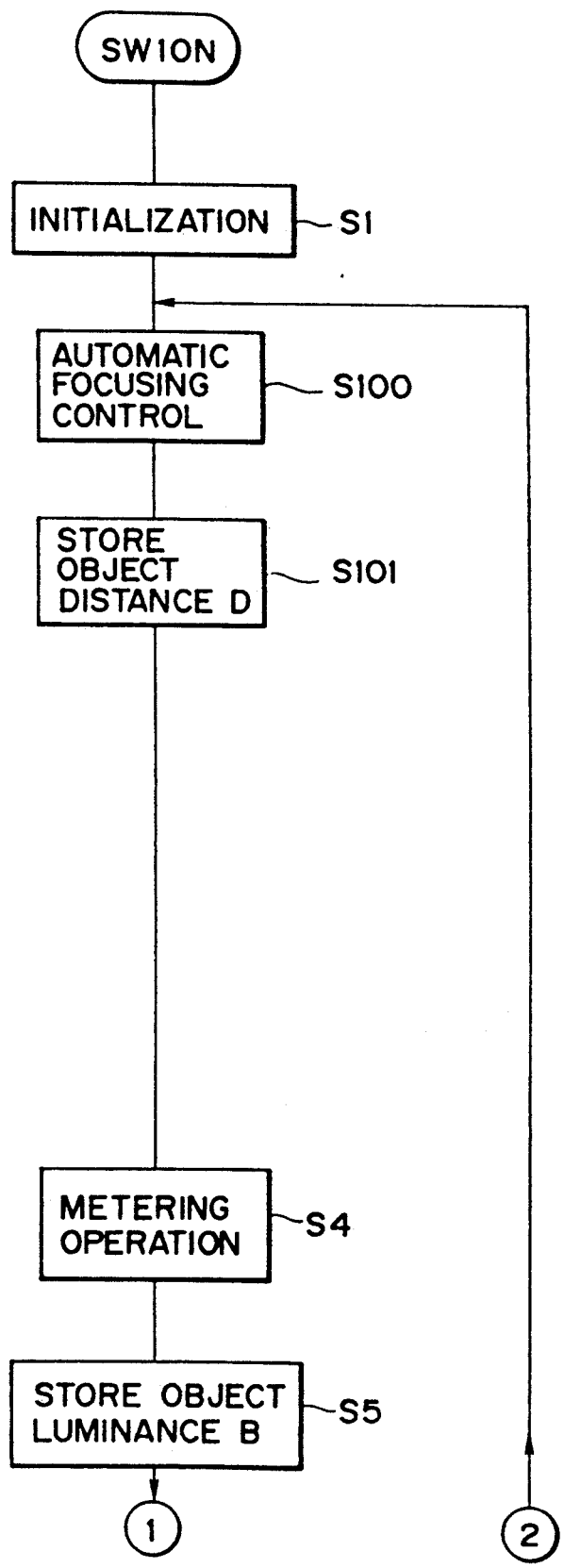
FIGS. 9 and 10 are flow charts showing the operation of the second embodiment of the present invention.

In FIG. 9, the initialization of step S1 is effected by the closing of the half depression switch SW1 as in FIG. 2, whereafter step S100 and step S101 are executed. At the step S100, the focus detecting circuit 30, the lens drive circuit 20 and the motor 90 are started to effect the automatic focusing control operation, whereby the photo-taking lens LE2 is focused to the object which occupies the central portion of the photographing picture plane. At the step S101, the object distance information D then obtained from the encoder of the photo-taking lens LE2 is stored.

The subsequent operation is similar to the steps S4–S12 of FIGS. 2 and 3.

Figure 10:
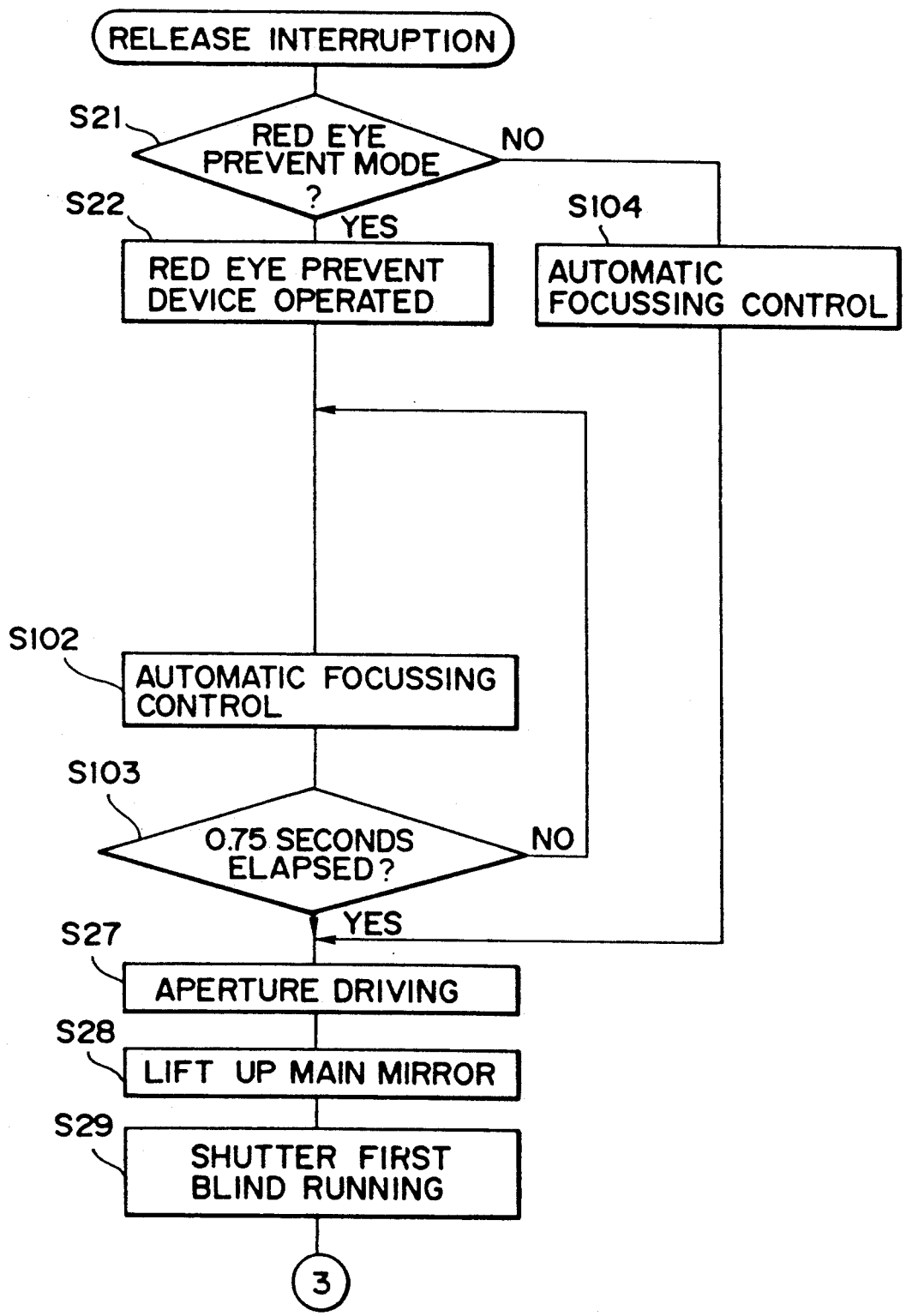

In FIG. 10, when the full depression switch SW2 (FIG. 8) is closed, at the step S21 of FIG. 9, as at the step S21 of FIG. 4, whether the red eye prevent mode is set is judged. If the step S21 is affirmatively judged, steps S102 and S103 are executed. At the step S102, automatic focusing control similar to the step S100 of FIG. 9 is effected. At the next step S103, whether 0.75 second (the pupil reduction waiting time) has elapsed from the pre-light emission by the light emission device 11 for preventing red eye is judged, and the automatic focusing control of the step S102 is continued until 0.75 second elapses. The operation after the pupil reduction waiting time has elapsed is similar to the steps S27–S37 of FIGS. 4–6.

If at the step S21 of FIG. 10, it is judged that the mode is not the red eye prevent mode, at step S104, automatic focusing control similar to the step S100 of FIG. 9 is executed, and shift is made to step S27.

According to this second embodiment, the automatic focusing control operation is effected until immediately before the exposure operation of the step S27 and subsequent steps is started and therefore, focusing to the object is ensured.

In the above-described two embodiments, design is made such that when the object distance D is equal to or greater than the value given by the equation (1) and the object luminance is equal to or less than a predetermined value, the photographing condition is judged to be a photographing condition under which the red eye effect occurs, but design may also be made such that when the object luminance is equal to or less than the predetermined value, the photographing condition is judged to be a photographing condition under which the red eye effect occurs, irrespective of the object distance. The present invention can also be applied to a camera in which the presence or absence of the occurrence of the red eye effect is not judged and during flash photographing, the red eye prevent mode is set without fail. The present invention can also be applied to a camera with which the photographer judges the presence or absence of the occurrence of the red eye effect and when he judges the occurrence of the red eye effect, if he closes the full depression switch SW2 while performing some operation or other, for example, while depressing a push button, pre-light emission is effected and the main light emission for photographing is effected in 0.75 second.

Further, the pre-light emission and the main light emission may be effected by a single flash discharge tube. This is disclosed in the aforementioned U.S. application Ser. No. 323,386.

Furthermore, an example in which an extraneously mountable electronic flash unit is mounted has been shown herein, but the present invention is also applicable to a camera containing an electronic flash unit therein. Also, the pre-light emission may be effected by a contained electronic flash unit, and the main light emission may be effected by an extraneously mountable electronic flash unit having a higher light emitting ability than the contained electronic flash unit.

We claim:

1. A camera comprising:

photographing means for executing a photographing operation for causing an image of an object formed by a phototaking lens to be recorded on an image recording medium;

main light emitting means emitting an illuminating light in synchronization with said photographing means;

deciding means which decides, based on brightness of an environment around said object, if a size of a pupil of a person's eye will be enlarged to such a degree that a red eye effect will be caused to occur when photographing is effected with the illuminating light of said main light emitting means, and, if so, producing a decision signal;

pre-light emitting means for effecting an emission of light toward said object for decreasing the size of said pupil;

releasing means operable for performing an exposure;

focusing means for adjusting said phototaking lens for focusing; and control means which controls said photographing means, said main light emitting means, said pre-light emitting means, and said focusing means, in response to said releasing means, so that when said decision signal is produced, said pre-light emitting means, said focusing means and said main light emitting means are operated in that order, and when said decision signal is not produced, said focusing means is operated and then said main light emitting means is operated.

2. The camera according to claim 1, further including measuring means which supplies to said control means information as to a distance to said object, in response to said releasing means, and wherein said control means operates after said distance information is supplied thereto.

3. The camera according to claim 1, further including means for producing distance information corresponding to a distance to said object, and wherein said deciding means predicts a size of said pupil based upon brightness of an environment around said object and said distance information.

4. The camera according to claim 1, further including a housing to which said phototaking lens is mounted, and wherein said main light emitting means includes a light emission window fixed to said housing, and said deciding means produces said decision signal when a distance to said object exceeds a distance at which an angle formed by lines from said phototaking lens and said light emission window, respectively, to a point on said object is less than a predetermined angle.

5. The camera according to claim 4, wherein said predetermined angle is about 2 degrees.

6. The camera according to claim 1, wherein, when said decision signal is produced, said control means operates said main light emitting means so that an illuminating light is emitted toward said object about 0.75 second after said pre-light emitting means is operated.

7. The camera according to claim 1, further including information producing means which detects said object to produce information for causing said phototaking lens to be focused on said object and wherein, in response to said releasing means, said control means operates after said pre-light emitting means operates.

8. A camera comprising:

photographing means for performing a photographing operation for causing an image of an object formed by a phototaking lens to be recorded on an image recording medium;

main light emitting means emitting an illuminating light in synchronization with said photographing means;

deciding means which decides, based on brightness of an environment around said object, if a size of a pupil of a person's eye will be enlarged to such a degree that a red eye effect will be caused to occur when photographing is effected with the illuminating light of said main light emitting means, and, if so, producing a decision signal;

pre-light emitting means for effecting an emission of light toward said object for decreasing the size of said pupil;

releasing means operable for performing an exposure;

focusing means for adjusting said phototaking lens for focusing; and control means which controls aid photographing means, said main light emitting means, said pre-light emitting means, and said focusing means, in response to said releasing means, so that when said decision signal is produced, said pre-light emitting means is operated and then said main light emitting means is operated after a predetermined time interval during which said focusing means is operated, and when said decision signal is not produced, said focusing means is operated and then said main light emitting means is operated.

9. A photographing method comprising the steps of:

(a) deciding if a size of a pupil of a person's eye will be enlarged to such a degree that a red eye effect will be caused to occur when flash photographing is performed, and, if so, producing a decision signal; and (b) performing different flash-photographing modes in response to an operation for starting photographing, as follows:

when said decision signal is produced, emitting light toward said person for decreasing the size of said pupil, then focusing said phototaking lens, and then emitting main illuminating light toward said person for flash photographing;

when said decision signal is not produced, focusing said phototaking lens and then emitting main illuminating light toward said person for flash photographing.

10. A photographing method comprising the steps of:

(a) deciding if a size of a pupil of a person's eye will be enlarged to such a degree that a red eye effect will be caused to occur when flash photographing is performed, and, if so, producing a decision signal;

(b) focusing a phototaking lens; and (c) executing different flash-photographing modes in response to an operation for starting photographing, as follows:

when said decision signal is produced, emitting light toward said person for decreasing the size of said pupil, then adjusting the focusing of said phototaking lens, and then emitting main illuminating light toward said person for flash photographing;

when said decision signal is not produced, emitting main illuminating light toward said person for flash photographing.

11. A camera comprising:

photographing means for executing a photographing operation for causing an image of an object formed by a phototaking lens to be recorded on an image recording medium;

main light emitting means emitting an illuminating light in synchronization with said photographing means;

deciding means which decides, based on brightness of an environment around said object, if a size of a pupil of a person's eye will be enlarged to such a degree that a red eye effect will be caused to occur when photographing is effected with the illuminating light of said main light emitting means, and, if so, producing a decision signal;

pre-light emitting means for effecting an emission of light toward said object for decreasing the size of said pupil;

releasing means operable for performing an exposure;

information producing means which generates information for causing said phototaking lens to be focused on said object; and control means which controls said photographing means, said main light emitting means, said pre-light emitting means, and said information producing means in response to said releasing means, so that when said decision signal is produced, said pre-light emitting means, said information producing means, and said main light emitting means are operated in that order.

12. The camera according to claim 11, wherein said information producing means produces information as to a distance to said object.

13. The camera according to claim 11, further including focusing means for adjusting said phototaking lens for focusing according to an output of said information producing means and wherein, in response to said releasing means, said control means operates after said information producing means operates.

* * * * *